March 10, 1953 J. C. MONK ET AL 2,631,101
METHOD OF CENTRIFUGALLY MIXING SUBSTANCES
AND APPARATUS THEREFOR
Filed June 15, 1948 2 SHEETS—SHEET 1

INVENTOR.
JOHN C. MONK
PAUL F. SHARP
BY
Francis J. Larkin
ATTORNEY

March 10, 1953  J. C. MONK ET AL  2,631,101
METHOD OF CENTRIFUGALLY MIXING SUBSTANCES
AND APPARATUS THEREFOR
Filed June 15, 1948  2 SHEETS—SHEET 2
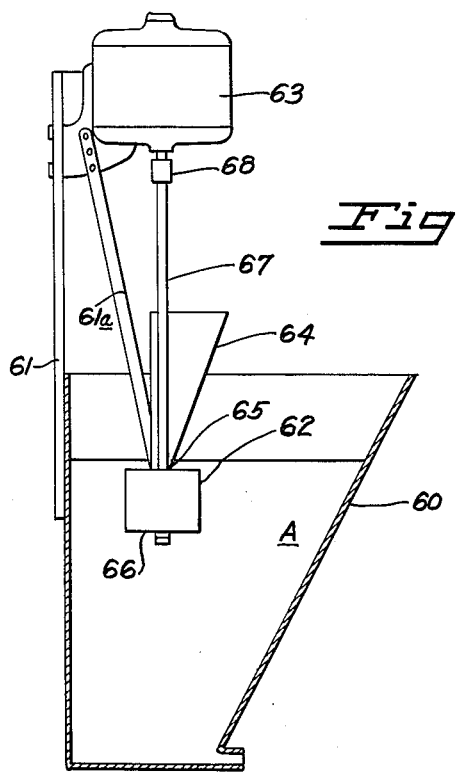
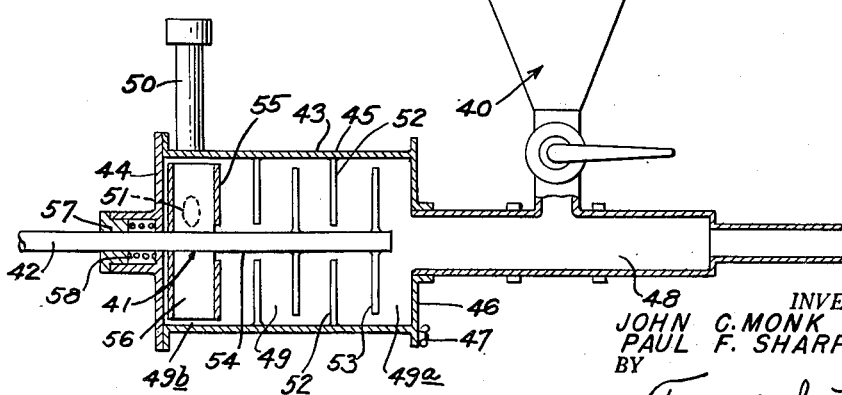
INVENTORS
JOHN C. MONK
PAUL F. SHARP
BY
*Francis J. Larkin*
ATTORNEY Patented Mar. 10, 1953

2,631,101

UNITED STATES PATENT OFFICE 2,631,101

METHOD OF CENTRIFUGALLY MIXING SUBSTANCES AND APPARATUS THEREFOR

John C. Monk, San Francisco, and Paul F. Sharp, Piedmont, Calif., assignors to Golden State Company, Ltd., San Francisco, Calif., a corporation of Delaware Application June 15, 1948, Serial No. 33,088

10 Claims. (Cl. 99—63)

This invention relates to a new and improved method of introducing solid materials into fluid medium. More particularly, the invention relates to the production of fluid suspensions according to a novel procedure which serves to convert suspensions of relatively coarse agglomerated material into fluids of smooth texture. Still more particularly, it relates to a method of reconstituting lacteal products in aqueous media to produce smooth liquid mixtures of fine texture. Still more particularly the invention relates to a method of reconstituting powdered milk.

This invention further relates to new and improved apparatus for carrying out the mixing method of the invention.

This invention provides a practical and economical method for rapidly producing smooth textured fluids, the term fluid being used to denote any material consisting of a mixture of liquid material with solid material, in solution, in suspension or both and containing sufficient liquid to permit such material to be handled as a liquid or plastic after treatment. For example, a particularly useful application of the invention is for the resuspending of precipitated casein in an aqueous medium. A casein foam, produced by the method described in Sharp patent application Serial No. 612,965, filed August 27, 1945, and entitled Casein Manufacturing Process and Apparatus, which is a moist solid material of between 14% and 40% total solids, is directed into the mixer without additional water. The product produced by treating the casein is a smooth creamy textured fluid.

The method of this invention is one which can be practiced with relatively inexpensive equipment, and which will produce a finished product of high grade, of smooth texture, and having the solids relatively permanently suspended therein.

According to one prior method of resuspending or reconstituting material in a fluid medium, the material and water is fed into a central chamber where an agitator-impeller imparts rotary motion. The periphery of the chamber is provided with screens having openings of predetermined size. The material is thrown against the screens which will pass only those particles within a definite size range. This method, however, is not capable of producing fluids in which the solids material is sufficiently fine for the instant purpose without danger of plugging the screens. Once plugged the only recourse is to shut down, to remove the screens and to clean them.

Another prior method useful for batch operation is the blender for mixing and pulping. The centrally located impeller unit consists of angled or curved knives and propeller blades. This impeller unit revolves at a speed of 10,000 R. P. M. The container used with this impeller is generally of a slightly non-circular design, ridged to direct the particles thrown to the periphery back into contact with the impeller blades. This method in addition to being a batch system, does not guarantee uniformity of particle size particularly in the very fine range required for organoleptically smooth material. Other disadvantages of this equipment is the large quantity of air incorporated in the fluid and the high speed which tends to wear parts and to make for expensive maintenance.

Still another prior method utilized in the search for a truly satisfactory reconstituting mechanism is the mixer wherein stationary saw teeth are mounted around the interior of the housing and a plurality of rotating mixing and milling chambers are rotatably mounted within the housing. The high speed rotor throws material being treated against the stationary teeth to effect disintegration and mixes the fragmented material into the stream of liquid passing through the narrow space between the teeth and the rotor. This apparatus due to its continuous mixing characteristics fails to provide means for restraining large particles from passing through the toothed section and getting entrained in outgoing liquid. It also fails to effect a segregation of particles based upon particle size which is so necessary if the product is to be a smooth textured fluid.

The present invention provides a method and apparatus which meets and overcomes the disadvantages of the above described apparatus and constitutes equipment superior to that heretofore known and used.

It is an object of this invention, therefore, to provide mixing equipment which is capable of producing a maximum amount of smooth textured fluid in a minimum of time.

It is another object of the invention to provide apparatus which will produce a continuous flow of treated fluid.

It is still another object of the invention to provide apparatus which is of sanitary construction thus permitting mixing of food products.

It is a further object of the invention to provide apparatus in which material is broken down into particles of such size that suspension is relatively permanent.

It is still a further object of the invention to provide apparatus of a centrifugal nature which will incorporate only minor amounts of air into the fluid product.

It is another object of the invention to provide apparatus which will return lacteal products to a relatively stable fluid state.

It is still another object of the invention to provide reconstituted milk products having a texture which is organoleptically indistinguishable from that of the original milk.

It is a further object of this invention to devise a novel method of treating liquids and attritionable solids which will effect the objects set forth above.

It is a further object of this invention to provide a new and improved method and means for reincorporating solids into liquids such as powdered whole milk into water and the like in an efficient and relatively inexpensive manner with the results that the finished product has the desired properties and is free from deterioration due to the reincorporation treatment.

Other objects and advantages not specifically enumerated will be apparent to one skilled in this art as the following description proceeds. The process of this invention will be more readily understood by reference to the accompanying drawings in which one apparatus is shown as illustrative and by which the process may be carried out. The apparatus itself constitutes a new and useful invention which is covered hereby.

Referring to the drawings:

Figure 4 is a side elevational view of another embodiment of the invention showing an impeller constructed to effect size segregation before the fluid passes to a peripheral outlet.

Figure 5 is a side elevational view of a portable unit having a small mixing chamber, embodying the principles of the instant invention, supported in a vertical instead of a horizontal position.

Figure 1:
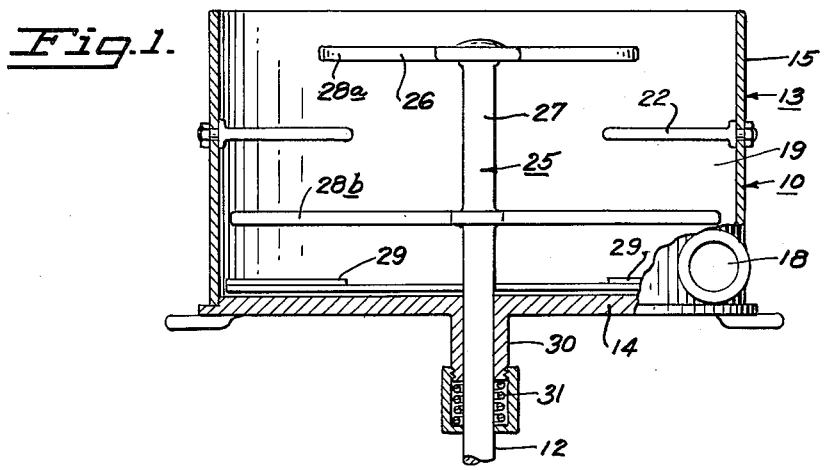
Figure 1 is a side elevational view.

In one embodiment of the present invention the method comprises as essential steps the continuous handling of a slurry of a disintegratable material in a plurality of nested or concentrically disposed treatment zones maintained within a treatment chamber. In the outer concentric zone, a slurry is subjected to turbulent flow conditions and impact forces which break down slurry particles into smaller sizes. In the inner zone, the fine particles are, if it hasn't been accomplished in the outer zone, thoroughly wetted and mixed with liquid by rotational circulation mixing before passing to the fluid outlet.

When handling a material which can be broken down by attrition, can be crumbled by impact or can be disintegrated into its parts, the most effective method of utilizing the centrifugal force as a regulator of uniformity of particle size in the product, is to feed the slurry to be treated into the mixing chamber at a point sufficiently removed from a central axial product outlet that the centrifugal force is greater than the force of the flow of the liquid traveling to the fluid outlet. In this way, the centrifugal action in the inner zone effects segregation of particles into size ranges according to their mass. Under these conditions only the finest particle size material is allowed to approach the centrally located fluid outlet. The largest particles upon which the centrifugal force will have the greatest effect are thrown to the outside. When no provision is made for the immediate removal of these relatively large particles at the periphery of the chamber such particles will be maintained in this peripheral zone into a zone of high speed turbulent flow having impact means for causing particle disintegration, the peripheral zone serves to reduce the particles to such size that the lessened centrifugal force on them permits the smaller particles or portions of particles to migrate toward the center of the mixer.

One simple procedure for carrying out the method is to feed unit quantities of material with or without unit quantities of fluid, continuously or continually into the hereinafter described apparatus wherein a rotor imparts rotational speed to a material fed into the rotor chamber. The material in the peripheral zone of the chamber is subjected to turbulence and impact by coming in contact with obstructions in the flow path.

Briefly, the apparatus of the invention is especially adapted to carry out the method of said hereinbefore described invention and comprises as essential elements a chamber provided with inlet and outlet passages and a multiplicity of impact means extending inwardly from the periphery of the chamber, and an impeller member.

The impeller member may be of any suitable construction provided, however, that turbulent high speed flow is maintained in the peripheral zone. One preferred type of impeller mechanism is that constructed with multiple impeller members which are sufficiently separated to permit insertion of obstruction elements between them in the peripheral zone of the chamber.

The impact means affixed to the periphery of the housing and extending inwardly toward the central impeller shaft may be of any size and design which does not interfere with the impeller operation and does not cause any marked turbulence in the central zone. In general, these obstructions are round spikes releasably affixed to the housing so that the chamber may be readily cleaned and sanitary conditions maintained when handling food products. In a preferred type of mixer described hereinafter, the spikes are shown as having a length of about one third of the radius of the chamber.

The more preferable embodiment of the invention, because of its simplicity and limited number of parts, comprises a casing or housing having a central chamber of circular or volute formation termed the back wall member and fitted with a detachable face plate. Mounted in the housing chamber is an impeller unit composed of one or more spike wheels. This impeller is mounted on an axially aligned shaft and is driven by suitable rotating means such as an electric motor or other prime mover capable of imparting high speed rotation.

Suitable means are provided for projecting into and removing from the housing, material being processed. Preferably, these consist of an axial opening in the center of the removable face plate and an opening usually tangentially directed at the periphery or transversely directed at a point near the periphery of the central chamber. Each of the inlet and outlet openings may be provided with suitable sealing means whereby pipes or flexible conduits may be detachably connected thereto.

Figure 2:
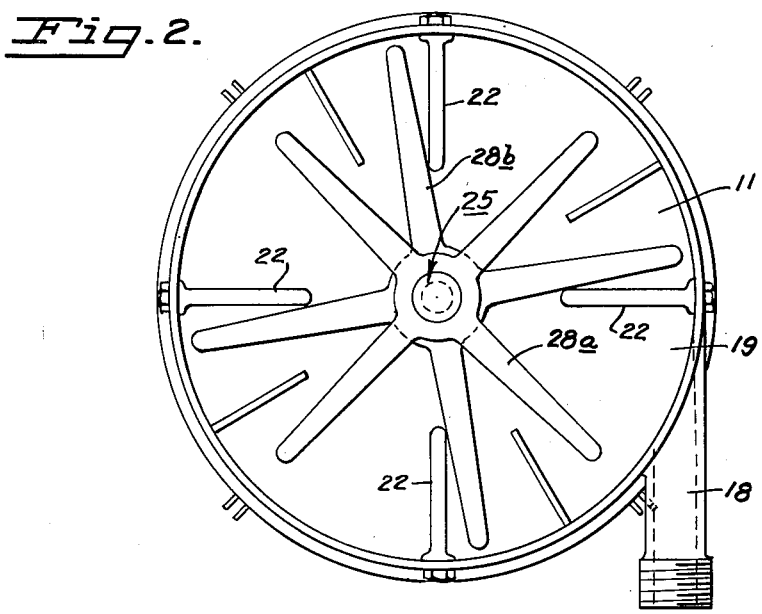
Figure 2 is a cross sectional view looking downward.
Figure 3:
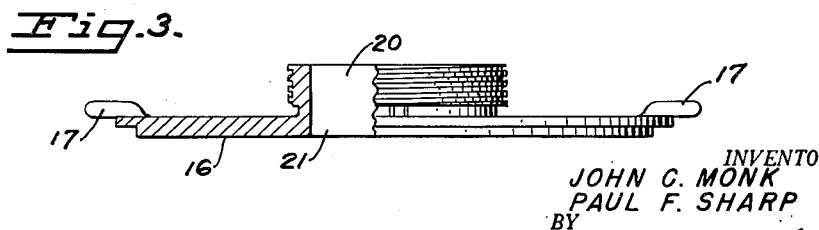
Figure 3 is a side elevational view of the pump face plate showing the centrally located axial liquid outlet or inlet means.

Referring to the detailed construction illustrated in Figures 1, 2 and 3, an embodiment of the invention, the complete assembly comprises a supporting structure 10 carrying a mixer assembly 11, driving mechanism 12 therefore, and any suitable source of power (not shown) such as an electric motor for actuating the impeller mechanism.

The mixer assembly consists of a main body or housing 13 which is circularly contoured and which includes the back wall 14 and the peripheral side wall 15. Extending across the front of this housing there is a face plate 16 which is likewise circularly contoured and in this instance substantially planar. Any suitable type of releasable fastening means 17, e. g. screws, bolts, swing nuts and the like may be provided for securing the face plate upon the housing 13.

The mixer is provided with a suitable passage 18 which communicates through side wall 15 with the treatment chamber 19. Material entering through passage 18 is treated within chamber 19 and is discharged through a passage 20 in face plate 16. The passage 20 communicates through the central portion of plate 16 with the interior of chamber 19 through port 21.

Releasably attached to the interior of housing wall 15 are obstruction means 22 positioned to extend toward the central axis of the chamber 19 and still not interfere with the rotation of moving parts. Mounted within the treatment chamber 19, is the mixer assembly 11 consisting of an impeller 25 having one or more radially extending means 26 such as star wheels carried by a suitable shaft 27. In this instance, the radially extending means 26 is shown as comprising two star wheels 28a and 28b and a disc 29. As illustrated, the rotatable shaft 27 can be carried by the bearings 30 and leakage past the shaft can be prevented by the use of a suitable sealing means 31 such as a packing gland. It is, of course, to be understood that impeller designs other than that shown can be used.

The parts forming the passage 18 and 20 are threaded or otherwise formed to facilitate coupling the same with equipment.

Operation of the apparatus described above, and the steps of the present method can be described as follows: The material to be reconstituted is supplied to the passage 18 at a suitable regulated rate. Passage 20 is connected with piping whereby the fluid is discharged to other equipment such as bottling equipment or generally for further processing. Shaft 27 is driven at a suitable rate by use of an electric motor or like source of power as for example at a speed of 2250 R. P. M. The material may be introduced into the treatment chamber 19 continuously for example by means of a powder feeder which drops measured quantities of powder into the inlet 18 and by means of a liquid metering pump which introduces the fluid into the same inlet. Within the treatment chamber the powder, if insoluble, is resuspended through the intense continuous turbulence and agitation encountered in the obstructed portion of the chamber 19. This agitation breaks up relatively large particles and the regulatable centrifugal force permits migration only of the particles of desired size range to the outlet 20.

Another mode of operation used when resuspending solids which are solid material of high moisture content and which require no additional fluid in which to suspend the solids is as follows: The direction of flow is reversed from that described above thus the material to be resuspended is supplied to chamber 19 through passage 20 at a suitable regulated rate. Passage 18 is connected with piping whereby the fluid product is discharged to other equipment for further processing. Within the treatment chamber the material is shredded and agitated by the star wheels and spikes and converted to a smooth slurry while being laterally displaced and passing across the width of the chamber which slurry is then forced from the chamber by the disc 29.

Assuming it is desired to clean the operating parts to maintain sanitary conditions when dealing with pharmaceuticals and food products, bolts 17 are removed to enable the face plate assembly to be removed from the housing, thus opening up the housing so that it can be thoroughly cleaned and sterilized.

The above outlined simplest embodiment of the invention will continuously unload the smooth textured fluid at a rate determinable by control or extrusion valve restriction on the outlet and rate of material input provided the back pressure or resistance in outlet line is not too great.

In another and the preferred embodiment of the invention peripheral outlet of liquid may be accomplished without the danger of large particles thrown to the mixing chamber periphery being entrained in the outgoing fluid. In this embodiment there is mounted on the axially aligned shaft in addition to the star wheels, a centrally apertured disc of substantially the same diameter as the chamber dividing the chamber longitudinally in two zones and impeller blades adapted to operate in the zone adjacent the outlet.

Referring now to Figure 4, illustrating the preferred embodiment of the invention, the unit comprises a structure 40 carrying a mixer assembly 41, driving mechanism 42 therefore and any suitable source of power (not shown) such as an electric motor for actuating the impeller mechanism.

The structure 40 consists of a main body or housing 43 which is circularly contoured and which includes the back wall 44, and the peripheral side wall 45. Extending across the front of this housing there is an axially perforated face plate 46 which is likewise circularly contoured. Any suitable type of releasable fastening means 47 may be provided for securing the face plate 46 upon the housing 43.

The housing 43 is provided with a suitable passage 48 which communicates through face plate 46 with the treatment chamber. Material entering through passage 48 is treated within chamber 49 and is discharged through a passage 50 in the housing 43. The passage 50 communicates through the periphery of housing 43 adjacent the back wall 44 with the interior of chamber 49 through port 51.

The parts forming the passages 48 and 50 are threaded or otherwise formed to facilitate coupling the same with equipment. Releasably attached to the interior of housing wall 45 are obstruction means 52 positioned to extend toward the central axis of the chamber 49 and still not interfere with the rotation of moving parts.

Mounted within the treatment chamber 49 is the mixer assembly 41 consisting of one or more radially extending means 53 such as star wheels carried by a suitable shaft 54. Positioned on said shaft at a point further removed from the inlet than the star wheels is a disc 55 which divides the chamber 49 into portions 49a and 49b. Disc 55 is perforated at the center and is preferably joined to the shaft 54 by a spider which frees the balance of the area of the perforation for passage of fluid. On the opposite side of disc 55 from the star wheels 53 there is positioned on shaft 54, suitable impeller blades 56. As illustrated, the rotatable shaft 54 can be carried by the bearing 57 and leakage past the shaft can be prevented by the use of a suitable sealing means 58 such as a packing gland.

Operation of this apparatus is as follows: The solid material being treated is supplied to the inlet 48. Fluid passes through this same inlet into the treatment chamber portion 49. Passage 50 is connected with piping whereby the fluid is discharged to other equipment. Shaft 54 is driven at a suitable rate. Within the treatment chamber 49 the mixture is subjected to impact action by being thrown against obstructions 52 and the centrifugal force segregates particles so that only those of the desired average size can reach the vicinity of the shaft 54. The smooth powder-liquid mixture accumulating around the central axis flows into chamber portion 49b through the central axial aperture in disc 55. Impeller blades maintain this chamber portion 49b under a higher pressure than portion 49a and discharges a major proportion of the fluid through outlet 50. A very minor proportion of the fluid recycles back into chamber portion 49a through the narrow space between the chamber periphery and disc 55 thus positively sealing this avenue against the passage of large particles which are being maintained by centrifugal force in the peripheral area of chamber portion 49a due to size.

The advantages of this invention are that effective particle size reduction and mixing can be carried out with a miscellaneous group of substances. The diversity is best illustrated by the fact that the identical apparatus may be used to produce an organoleptically smooth fluid whether the feed material is a moist solid of the casein type, a fruit to be converted into a puree, a slurry, or powder and fluid fed independently or simultaneously into the mixer.

Further, the apparatus may be varied in size without loss of efficiency so that it can produce one gallon or less per minute or 60 gallons or more per minute. It may also be produced in models designed about a vertical axis, as well as a horizontal axis, whereby the powder feed from the feed hopper is automatically controlled by the negative pressure in the mixing chamber.

This latter type of apparatus is illustrated in Figure 5. This portable mixing unit comprises a holding tank 60, shown partially filled with liquid A, which supports, by means of standard 61, both a mixing unit 62 and a motor 63. The mixing unit 62 is positioned by supporting arm 61a in a submerged position and in axial alignment with the motor 63. This mixing unit 62 is similar in internal design and in operation to the unit shown in Figure 4. Powder is fed to mixing unit 62 through a hopper 64 while liquid enters the unit through apertures 65 in the top horizontal face of the mixer forming a concentric ring about the feed hopper 64.

The mixture produced in the mixer 62 issues through a number of countersunk, self-cleaning apertures 66 in the lower horizontal face of the mixer. The rotatable mixing element in the mixing unit 62 has an elongated shaft 67 which passes downward from the connector 68 on the shaft of motor 63 through the powder feed hopper 64.

This unit is primed with water when submerged. When the mixer is operating the water level falls to a predetermined level within the mixer 62 thus permitting powder to fall into the mixer. The surface level of liquid in the mixer 62 causes regulation of negative pressure which in turn regulates the rate at which powder feeds to the mixer.

By proper design of the apertures 66 in the lower horizontal face of the mixer 62, the liquid issuing from the apertures can be caused to flow in a manner which insures thorough mixing in tank 60 and to recirculate fluid so that an even distribution of solids is affected.

The success of this invention is believed to be attributable to the fact that the impeller forcibly maintains rotational flow in the peripheral zone despite turbulence, thus making centrifugal force the controlling factor in determining particle size of the suspended material which issues from the above described apparatus.

Starting temperature of material is relatively unimportant to the instant invention, except that due to the non-sensitivity to temperature, food materials for example may be reconstituted at low temperature levels which are not favorable to bacterial growth, but are favorable from a sanitary viewpoint to continuous operation.

For purposes of illustration, the following specific examples of actual runs carried out in accordance with this invention will now be given.

*Example No. 1*

A tank containing approximately 180 gallons of clean water having a temperature of about 50° F. was connected to a mixer of the type shown in Figure 4. Liquid flowed into the mixer at the rate of approximately 60 gallons per minute through a 1½ inch pipe. Milk powder was continuously metered into the liquid as the liquid entered the mixer at a rate of approximately 65 pounds per minute. The mixer had a chamber 6¾ inches in diameter and 7½ inches depth. This chamber was divided by the disc into a 6 inch mixing section and a 1½ inch discharging section. The reconstituted mix was discharged under positive pressure to a holding tank. The reconstituted batch was pumped from this tank through an extrusion valve, then passed through a milk filter and over a cooler to bottling apparatus.

This reconstituted milk was of excellent quality. The low temperature of 50° F., a temperature 50° F. below normal reconstituting temperatures, had minimized bacterial growth. Further, the milk was of smooth character with particle size characteristics organoleptically indistinguishable from fresh milk.

*Example No. 2*

Forty-one thousand pounds per hour of skim milk was treated to produce roughly 9,500 pounds of aerated casein foam. This aerated foam or curd, when issuing from the washing tanks, has a solids content of about 14%. This moist solid material was fed directly to the above described apparatus without any additions of fluids.

Roughly, 4,500 quarts per hour of a milk-like fluid was produced. The fluid issuing from the mixer was smooth textured and the casein therein was broken down to give an organoleptically undetectable size.

Although the present invention has been described in relation to the illustrated preferred form of apparatus, it should be understood that the present invention is not limited to the apparatus described, but refers to such modifications and equivalents as are obvious. For example, it will be obvious to those skilled in this art that many modifications may be made in the above described apparatus which change the form of the equipment but does not alter the mode of operation. For example, modifications may be made so that the liquid and powder are introduced countercurrent to one another, i. e. liquid from the bottom, and powder from the top in such manner that the dry powder and liquid meet in a zone subjected to centrifugal forces and vigorous agitation. While the resultant mixture is traveling in a plane at an angle of 90° to the axis of the rotor further agitation and mixing is accomplished by impacts and shears between moving and stationary parts, following this additional mixing the resultant product flows under pressure into a zone of diminishing clearances at which point the product is subjected to extrusion and shearing through the small peripheral opening between parts which in effect form a continuous peripheral orifice.

Also there may be used with this apparatus an improved hopper arrangement which is conically shaped and symmetrical about the axis. In such a hopper a powder metering mechanism may be provided as for example one which is conical in form and inverted to the hopper and which is compelled to move axially up and down while simultaneously rotating at a speed slower than the shaft and pump impeller. With such an arrangement of apparatus, the inverted cone when not in motion acts as a closure for the powder feed hopper but when in motion it acts as a metering device.

It will be seen from the foregoing that an apparatus and process has been provided which accomplishes a continuous, particle size reduction and suspension of the comminuted material in fluid mediums.

We claim:

1. The method of producing a smooth textured liquid from a combination of disseminatable solid material and a liquid which comprises continuously introducing solid material and liquid into an enclosed space, obstructing the peripheral area of said space at both laterally and peripherally spaced intervals, said obstructed areas extending into the core of said space, rotating the material in the core of the space at high speed by continuously impelling said material in the laterally spaced unobstructed zones, which impelling simultanously gives rise to centrifugal force on said material and to particle disintegrating action of impact with said peripheral zone obstructions, maintaining the relatively coarse particles by centrifugal action in the peripheral area of said space where the particles are subjected to disintegrating action until comminuted to the desired degree, and withdrawing the substantially smooth textured composition from the zone of impact.

2. The method of producing a smooth textured liquid from a combination of disseminatable solid material and a liquid which comprises: continuously introducing solid material and liquid into an enclosed space, the introduction being made at a point where the centrifugal force exerted on the relatively large particles exceeds the force of liquid flow tending to move such particles to the liquid outlet, obstructing the peripheral area at both laterally and peripherally spaced intervals, said obstructed areas extending into the core of said space, rotating the material in the core of said space at high speed by continuously impelling said material in the laterally spaced unobstructed zones which impelling simultaneously gives rise to centrifugal force on the solid particles and to particle disintegrating action of impact with said peripheral zone obstructions, maintaining the relatively coarse particles by centrifugal action in the peripheral area of said space where the particles are subjected to disintegrating action until comminuted to such size that reduced centrifugal force allows migration of the comminuted particles into the outflowing fluid stream.

3. The method of producing smooth textured liquids from a combination of disseminatable solid material, a portion of which is soluble and a portion of which is disintegratable and a liquid which comprises: continuously introducing solid material and liquid into an enclosed space in quantities maintaining the space filled to overflowing the introduction being made at a point where the centrifugal force exerted on the relative large particles exceeds the force of liquid flow tending to move such particles to the liquid outlet, obstructing the peripheral area of said space at both laterally and peripherally spaced intervals, said obstructed areas extending into the core of said space, rotating the material in the core of said space at high speed by continuously impelling said material in the laterally spaced unobstructed zones at high speed which impelling simultaneously gives rise to centrifugal force on the solid particles and to particle disintegrating action of impact with the peripheral zone obstructions, maintaining the relatively coarse particles by centrifugal action in the impact zone of said space until so reduced in size as to allow their migration into the outflowing fluid stream.

4. The method of resuspending dried solid material in a liquid medium which comprises: continuously introducing measured quantities of dry solid material and liquid into an enclosed space divided into inlet and outlet portions, the quantities of liquids and solid material maintaining the space filled to overflowing, obstructing the peripheral area of said space at both laterally and peripherally spaced intervals, said obstructed areas extending into the core of said space, rotating the material in the core space at high speed by continuously impelling said material in the laterally spaced unobstructed zones which impelling simultaneously gives rise to centrifugal force on the solid particles and to particle disintegrating action of impact with the peripheral zone obstructions, maintaining the relatively coarse particles by centrifugal action in the peripheral area of said space where they are subject to disintegrating action until comminuted to the desired average particle size, flowing the mixture composed of liquid and that portion of the solids whose small size has allowed migration into the central axial zone of said circular space through an axial aperture into the outlet portion of said space and discharging the liquid from said outlet portion of said space.

5. The method of reconstituting powdered milk which comprises: introducing water and dry milk into an enclosed space, the introduction being made at a point where the centrifugal force exerted on the relative large particles will exceed the force of liquid flow tending to move such particles to the liquid outlet, obstructing the peripheral area of said space at both laterally and peripherally spaced intervals, said obstructed areas extending into the core of said space, rotating the material in the core space at high speed by continuously impelling said material in the laterally spaced unobstructed zones which impelling simultaneously gives rise to centrifugal force on the solid particles and to particle disintegrating action of impact with the peripheral zone obstructions, maintaining the lumpy coarse particles by centrifugal action in the peripheral area of said space, until reduced to suspendable size, and withdrawing the smooth textured product through an axial outlet.

6. The method of reconstituting powdered milk which comprises: metering powdered milk into a predetermined quantity of water, continuously introducing the combination into an enclosed space having separate inlet and outlet portions, obstructing the peripheral area of said space at both laterally and peripherally spaced intervals, said obstructed areas extending into the core of said space, rotating the material in the core of the space, at high speed by continuously impelling said material in the laterally spaced unobstructed zones which impelling simultaneously gives rise to centrifugal force on the solid particles and to particle disintegrating action of impact with the peripheral zone obstructions, maintaining the relatively coarse particles by centrifugal action in the peripheral area of said space where they are subject to disintegrating action until comminuted to the desired average particle size, flowing the reconstituted fluid to the outlet portion of the chamber along central axial path and discharging the liquid from the outlet portion of said space at a rate insuring that said space always remains filled with liquid.

7. The method of resuspending moist casein curd which comprises: continuously introducing the curd into the disintegrating zone of an enclosed space in quantity maintaining the space substantially filled, obstructing the peripheral area of said space at both laterally and peripherally spaced intervals, said obstructed areas extending into the core of said space rotating the material in the core of the space at high speed by continuously impelling said material in the laterally spaced unobstructed zones which impelling simultaneously gives rise to centrifugal force on the solid particles and to particle disintegrating action of impact with the peripheral zone obstructions, maintaining the relatively coarse particles in the impact zone adjacent to the periphery by centrifugal force until reduced to such particle size that the centrifugal force exerted is insufficient to prevent migration through the circulating liquid into an inner zone, and continuously withdrawing a smooth liquid suspension from the inner zone of said space.

8. In a centrifugal machine for producing smooth textured liquids the combination of a circular chamber, an inlet at one end of said chamber, a high speed rotor shaft, a centrally perforated disc so mounted on said shaft as to divide the chamber into inlet and outlet portions, a peripheral outlet opening from the outlet portion of the chamber, sets of laterally extending arms mounted on that section of said shaft in the inlet portion of said chamber, flow obstruction means mounted in the periphery of the inlet portion of the chamber and disposed between the rotatable laterally extending arms, and impeller blades mounted on that section of said shaft in the outlet portion of said chamber.

9. A centrifugal machine for producing smooth textured liquids comprising a chamber provided with an inlet and an outlet, powder feeding means at the inlet to said chamber, a high speed rotor shaft, a centrally perforated disc mounted on said shaft and dividing the chamber into inlet and outlet portions, sets of laterally extending arms mounted on that section of said shaft in the inlet portion of said chamber, flow obstruction means releasably mounted in the periphery of the inlet portion of the chamber and disposed between the rotatable laterally extending arms, and impeller blades mounted on that section of said shaft in the outlet portion of said chamber, the outlet extending from adjacent the outer ends of the impeller blades.

10. A sanitary reconstitution machine for powdered milk comprising a chamber provided with an inlet and an outlet, powder feeding means at the inlet to said chamber, a centrally perforated plate transversely in said chamber intermediate its ends and dividing the chamber laterally into inlet and outlet portions, flow obstruction means mounted in the periphery of the inlet portion of the chamber, a high speed rotor shaft, sets of laterally extending arms mounted on that section of said shaft extending through the inlet portion of said chamber and impeller blades mounted on that section of said shaft in the outlet portion of said chamber, the outlet being located adjacent the outer ends of the impeller blades.

JOHN C. MONK.
PAUL F. SHARP.

REFERENCES CITED

The following references are of record in the file of this patent:

UNITED STATES PATENTS

| Number | Name | Date |
| --- | --- | --- |
| 812,849 | Jaquet | Feb. 20, 1906 |
| 1,363,368 | Sonsthagen | Dec. 28, 1920 |
| 2,155,697 | Young | Apr. 25, 1939 |
| 2,191,095 | Hobbie | Feb. 20, 1940 |
| 2,213,056 | Skoog et al. | Aug. 27, 1940 |
| 2,230,146 | Myers | Jan. 28, 1941 |
| 2,328,950 | Brant | Sept. 7, 1943 |